May 7, 1935. J. F. VAUGHAN 2,000,625
MEASURING INSTRUMENT
Filed May 16, 1934
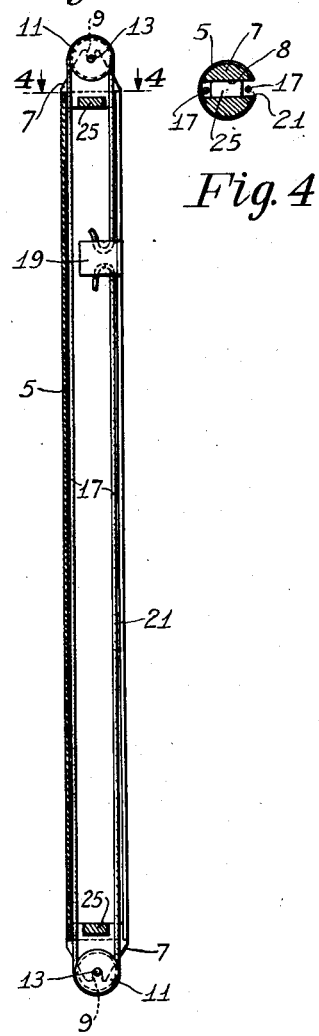
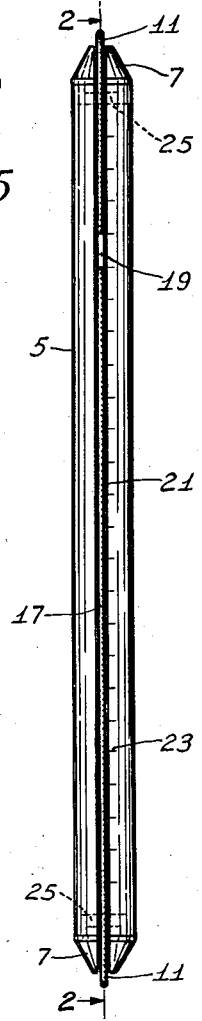
Inventor
John F. Vaughan
by his Attorneys
Fish, Hildreth, Cary & Jenney Patented May 7, 1935

2,000,625

UNITED STATES PATENT OFFICE 2,000,625

MEASURING INSTRUMENT

John F. Vaughan, Belmont, Mass.

Application May 16, 1934, Serial No. 725,925

8 Claims. (Cl. 33—141)

The present invention relates to measuring instruments and more particularly to an instrument designed and adapted for measuring distances along curved and angular paths, as for example, distances on automobile road maps, nautical charts, etc.

Heretofore it has been a common practice to measure such distances by means of a strip of paper or a string held in the fingers, or by dividers and other devices. Where more accurate measurements are required, measuring instruments are used, a common form having a wheel arranged to be rolled along the path to be measured and connected through gearing with distance indicating devices. Such instruments are more or less expensive to construct and are awkward to use.

The object of the present invention is to provide a simple, inexpensive measuring device which shall be accurate, of small and convenient size so that it may be carried in the pocket of the motorist, and which may be used with the greatest facility and without obstruction of the operator's view of the map.

With these objects in view the present invention comprises, generally speaking, a supporting frame adapted to be held in the hand of the operator and carrying a measuring band or tape over an exposed guide roll at one end of the frame, the band or tape supported thereby being adapted to be moved along the path to be measured and the movement of the band in the frame indicating the distance.

Other features of the invention will be apparent to those skilled in the art from the following specification.

In the accompanying drawing which illustrates the preferred form of the present invention, Fig. 1 is a full size, front elevation of the improved measuring instrument; Fig. 2 is a vertical sectional view on lines 2—2 of Fig. 1, looking towards the right; Fig. 3 is a bottom plan view of Fig. 1; Fig. 4 is a horizontal transverse section on line 4—4 of Fig. 2; and Fig. 5 is a section of one of the end members.

In order that the instrument may be of small and compact form and easily carried about in the pocket of the user, the supporting frame for the measuring band is made in the form of a tube or barrel 5, a convenient size being only a little larger in diameter and in length than the ordinary pencil or fountain pen, having tapered end members 7, shown in front elevation in Fig. 5. Each end or member is slotted as indicated at 8, to receive the guide roll 11 and to provide channels for the band. The extremities of the end members are provided with notches or recesses 9 to form bearings for the shafts 13 of the guide rolls.

Supported by these rolls and lying within the tubular frame or barrel 5 is the endless measuring band 17, conveniently formed of a small braided textile cord, which preferably is treated with rubber or other friction and preservative material. The ends of the cord may be connected to form an endless band in any suitable manner, as by the metal clamp 19 consisting of a piece of sheet metal bent into U-shape to clamp the ends of the cord.

In order to facilitate the reading of the extent of movement of the endless band when the instrument is in use, a longitudinal slot 21 has been provided extending from one end to the other of the barrel and directly opposite one leg of the endless band. The clamp 19 for the ends of the band is arranged to slide in this slot, with its outer surface substantially flush with the outer surface of the barrel, serving as an indicator to show the extent of movement of the band.

The end members 7 are formed with a crosspiece or bar 25 which also serves as an abutment to be engaged by the clamp 19, so that the instrument may be easily set for operation by merely bringing the clamp into engagement with an abutment.

While ordinarily the distance measured by the band will be determined by rolling the band backwardly upon the scale of distances on the map until the clamp is returned to its starting position, as more fully hereinafter explained, it may be desirable to provide for the reading of the instrument directly from the band or tape itself, in which case a scale 23 will be provided along one edge of the slot with its zero point at one end of the abutments.

Any desired scale may be used, or more than one, but preferably the scale will be in inches and fractions, since this will permit readings to be translated into miles, irrespective of the scale upon which the map is drawn, by merely multiplying the reading of the instrument in inches by the scale of the map.

In operation, the instrument is held in the fingers of the operator in a substantially vertical position, very much as a pencil. With the indicating clamp set in engagement with the upper abutment, the instrument is applied to the map with the band which passes over one of the end sleeves resting on the starting point of the path or highway to be measured, and the slot in the barrel pointing to the front. The instrument is then rolled along the path or highway on the map, keeping the slot always to the front and turning or rotating the barrel in the fingers to follow the curves and bends in the highway.

When the end of the path to be measured is reached, the instrument is lifted from the map, transferred to the scale on the map, and rolled along the scale in a reverse direction till the indicator on the tape has returned to the starting point. The point on the map scale at which the instrument is stopped is the distance as measured on the map. If the instrument scale is used, the distance may be read directly therefrom, or if the scale be in inches, the distance may be easily and quickly calculated in the manner as above set forth.

The instrument above described, with the small pencil-like barrel and tapering ends, is most convenient, not only for carrying about, but also for manipulation in use. It is of the simplest and cheapest construction, has a minimum of moving parts, and may be assembled with great facility and economy without the use of screws or rivets, the band being slipped over the bar 25 of each tapered end before such end is assembled in the barrel, and the guide rolls being then positioned in their sockets in the ends. The band is then slipped into the grooves in the rolls, the elasticity of the band being sufficient to permit this, and thereafter holding the rolls in their bearings. The end members will preferably be dimensioned to fit snugly within the ends of the barrel, but even if slightly loose they will be held in position by the elasticity of the band.

While preferably the band is arranged as shown in the drawing, to extend beyond the periphery of the bottom guide roll so that it may contact directly with the surface of the map, this is not an essential feature except where so specifically set forth in the claims. Nor is it essential that the device should be made symmetrically with both ends alike, although such construction obviously conduces to the convenience of the operator, as either end may be used as the operative end and applied to the map.

Nor is the present invention limited to the use for measuring distances on maps, as obviously it is adapted for accurate measurement of dimensions on other surfaces whether flat or curved, and along lines both angular and straight.

It is to be understood that while the invention has been illustrated and described in what is now considered to be its preferred form, it is not to be limited to the specific details of construction herein shown and described, but may be embodied in other forms within the purview of the claims.

Having thus described the invention, what is claimed is:

1. A measuring instrument for making measurements on maps and the like, comprising a supporting frame, a flexible, endless measuring band, the frame and band being provided with cooperating indicating devices, rotatable means carried by the frame for supporting the band, said means including a rotatable guide having a band-guiding face on its periphery to guide the band, with the outer face thereof extending beyond the periphery of the guide to permit the band to be applied to the map along the path to be measured, thereby to cause movement of the band with respect to the frame to indicate the distance measured.

2. A measuring instrument for making measurements on maps and the like, comprising a flexible, endless band, a tubular support, guide rolls for the band rotatably mounted in the support, one of said rolls projecting beyond the end of the support, and with a band receiving groove in its periphery to support the band with the latter projecting beyond the periphery of the roll, the tubular support being provided with a longitudinal slot adjacent the band, and cooperating indicating devices carried by the band and tubular support to indicate the movement of the band within the support.

3. A measuring instrument for making measurements on maps and the like, comprising a barrel, guide rolls at the ends of the barrel, a flexible, endless measuring band within the barrel and supported by the rolls, the barrel being provided with a longitudinal slot opposite the band, and cooperating indicating devices carried by the band and barrel to indicate the extent of movement of the band within the barrel.

4. A measuring instrument for making measurements on maps and the like, comprising a barrel having tapered ends and a longitudinal slot throughout the length thereof, guide rolls mounted in the tapered ends and extending beyond the barrel, a flexible, endless measuring band within the barrel and carried by said rolls, an indicator carried by the band and movable in the slot, and a fixed abutment within the barrel adjacent one end thereof to engage the indicator.

5. A measuring instrument for making measurements on maps and the like, comprising a slotted tubular barrel, end members, each having one end shouldered to be received in the barrel and the other end tapered and its tapered end and opposite sides slotted, a guide roll mounted in the tapered end of each end member, and an endless band positioned within the barrel and supported by the guide rolls with one leg adjacent the slot in the barrel.

6. A measuring instrument for making measurements on maps and the like, comprising a slotted tubular barrel, a member frictionally mounted within each end of the barrel, a guide roll carried by each member, and an endless band carried by the guide rolls.

7. A measuring instrument for making measments on maps and the like, comprising a tubular barrel, a guide roll rotatably mounted at each end of the barrel, and an endless band carried by the guide rolls.

8. A measuring instrument for making measurements on maps and the like, comprising a supporting frame, a flexible, endless measuring band member provided with indicating means, means carried by the frame for supporting the band member, said means including a rotatable member having a face for supporting the band member, said rotatable member and band member supported thereby being positioned to bring one of said members into engagement with the surface of the map so that movement of the instrument along the path to be measured will cause movement of the measuring band member to indicate the distance measured.

JOHN F. VAUGHAN.